United States Patent
Garanzha

(10) Patent No.: US 10,339,052 B2
(45) Date of Patent: Jul. 2, 2019

(54) MASSIVE ACCESS REQUEST FOR OUT-OF-CORE TEXTURES BY A PARALLEL PROCESSOR WITH LIMITED MEMORY

(71) Applicant: Kirill Garanzha, Moscow (RU)

(72) Inventor: Kirill Garanzha, Moscow (RU)

(73) Assignee: CENTILEO LLC, Moscow (RU)

( * ) Notice: Subject to any disclaimer, the term of this patent is extended or adjusted under 35 U.S.C. 154(b) by 465 days.

(21) Appl. No.: 15/067,237

(22) Filed: Mar. 11, 2016

(65) Prior Publication Data

US 2016/0267006 A1 Sep. 15, 2016

Related U.S. Application Data

(60) Provisional application No. 62/131,270, filed on Mar. 11, 2015.

(51) Int. Cl.
*G06F 12/0802* (2016.01)

(52) U.S. Cl.
CPC .. *G06F 12/0802* (2013.01); *G06F 2212/1008* (2013.01); *G06F 2212/302* (2013.01); *G06F 2212/455* (2013.01)

(58) Field of Classification Search
None
See application file for complete search history.

(56) References Cited

U.S. PATENT DOCUMENTS

| | | | |
|---|---|---|---|
| 9,235,512 B2 | 1/2016 | Dietrich et al. | |
| 2008/0238919 A1* | 10/2008 | Pack | G06T 15/04 345/420 |
| 2015/0199280 A1* | 7/2015 | Molnar | G06F 12/1027 711/207 |
| 2015/0309940 A1* | 10/2015 | Kumar | G06F 12/1009 345/506 |
| 2017/0060743 A1* | 3/2017 | Kumar | G06F 12/1009 |

OTHER PUBLICATIONS

Sellers, G., Obert, J., Cozzi, P., Ring, K., Persson, E., de Vahl, J., & van Waveren, J. M. P. (Jul. 2013). Rendering massive virtual worlds. In ACM SIGGRAPH 2013 Courses (p. 23). ACM.*
Rössler, Lukas. Rendering interactive maps on mobile devices using graphics hardware. na, 2012.*
Beyer, Johanna, Markus Hadwiger, and Hanspeter Pfister. "A survey of GPU-based large-scale volume visualization." (2014).*
Cornel, Daniel. "Texture Virtualization for Terrain Rendering."*
Neu, Andreas. "Virtual texturing." arXiv preprint arXiv:1005.3163 (2010).*
Mittring, Martin. "Advanced virtual texture topics." ACM SIGGRAPH 2008 Games. ACM, 2008.*
Peter J. Denning, "Virtual Memory", ACM Computing Surveys (CSUR), Sep. 1970, pp. 153-189, vol. 2 Issue 3, ACM New York, NY, USA.
J.M.P. Van Waveren, "Software Virtual Textures", Feb. 25, 2012, web-site http://www.mrelusive.com/publications/papers/Software-Virtual-Textures.pdf.

* cited by examiner

Primary Examiner — Ryan M Gray

(57) ABSTRACT

In one embodiment, a method comprising organizing access request by a processor to elements of textures, wherein a storage representation of a plurality of all the textures has a much larger size than a capacity of processor memory, wherein the plurality of all the textures is stored only out-of-core, wherein the processor requests access to incoherent data locations randomly distributed across the plurality of all the textures.

12 Claims, 10 Drawing Sheets

MASSIVE ACCESS REQUEST FOR OUT-OF-CORE TEXTURES BY A PARALLEL PROCESSOR WITH LIMITED MEMORY

REFERENCE TO RELATED APPLICATION

This application is a non-provisional application claiming the benefits of provisional application Ser. No. 62/131,270 filed Mar. 11, 2015.

TECHNICAL FIELD

The present disclosure is generally related to computer data processing and caching.

BACKGROUND

In certain graphics processing applications, an array of texels is requested by a data processing system from a plurality of textures. A texture comprises an array of values representing spatially varying attributes applied to some object or geometry surface. The plurality of textures may require a very large storage capacity compared to the processor memory of a computer comprising a processor, wherein at the same time, a processing system may request the texels that are randomly distributed across the plurality of textures. If the processor memory capacity is not enough to store the plurality of textures, the textures are stored "out-of-core" (e.g., in an external memory distinct from a processor memory).

Further, some scenes for feature film rendering and visualization have high detail complexity, and can easily contain millions of textures mapped on geometry surfaces. Certain film scene representations comprise textures of high resolution, wherein texture resolution refers to the size of an array of texels representing a texture. Some detailed textures comprise from a few thousand to a billion of texels. Such graphics scenes may require from several gigabytes to terabytes of storage capacity to be able to store all the detailed textures attached to the objects. Demands for greater photorealism, more realistic materials, complex lighting and global illumination push computational bounds, which often result in long render times and out-of-core data access even on large systems.

SUMMARY

In one embodiment, a method comprising organizing access request by a processor to elements of textures, wherein a storage representation of a plurality of all the textures has a much larger size than a capacity of processor memory, wherein the plurality of all the textures is stored only out-of-core, wherein the processor requests access to incoherent data locations randomly distributed across the plurality of all the textures.

In one embodiment, a multi-level data caching system and multi-level page structuring of a texture is used, comprising a method of efficient handling by a processor of a virtual page table for a large amount of small pages, wherein it is impossible or impractical to store a full page table for all the pages in a given memory capacity of the processor.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
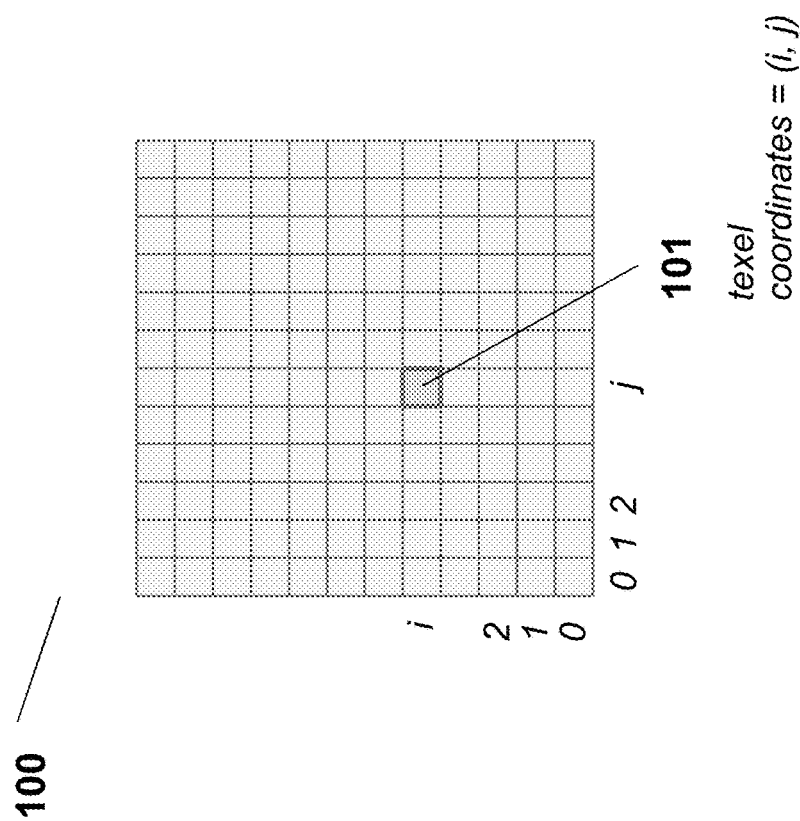
FIG. 1 is a schematic diagram that illustrates an example texture.

Disclosed herein are certain embodiments of an invention involving data processing systems and methods that include organizing an efficient, massive request access by a processing system to the elements of textures, wherein a storage representation of the plurality of all the textures may have a much larger size than the capacity of the processor memory, wherein the plurality of all the textures may be stored only out-of-core (e.g., not in a processor memory, but in an external memory distinct from the processor). In some embodiments, a specific multi-level caching system is used that enables efficient high-throughput access by a processing system to the out-of-core data.

Digressing briefly, for rendering or large dataset processing, a common practice is to use programs running on central processing units (CPUs). Modern CPUs may have several (e.g., 4-16) compute cores, and system motherboards may support up to 100 or 200 gigabytes (GB) of double data rate (DDR) memory (e.g., DDR3), which provides fast access to the data (e.g., faster when compared to, for instance, access to a disc).

Many areas of data processing, computer graphics, including film rendering, physical simulation, visualization and interactive rendering, etc., are rapidly impacted by the computational power and programmability of modern throughput architectures commonly available in today's graphics hardware (e.g., Graphics Processing Unit, GPU). Rendering and simulation applications that were considered strictly offline are becoming more interactive on throughput architectures primarily due to faster computation speeds (e.g., 10-20 times faster) and higher internal memory bandwidth in comparison to traditional CPU architectures. Unfortunately, the amount of available physical memory on modern GPUs is an order of magnitude smaller than on standard multi-core CPUs.

One challenge may involve determining how to process large datasets of textures, which contain tens and hundreds of gigabytes of data, on a GPU processor. Although a GPU provides a high-performance (1-5 terraflops or TFlops), parallel computation of small sub-tasks that solve a larger task, modern GPUs have an on-board memory of only 1-6 GB capacity, no virtual memory manager (an example of virtual memory manager is a system which may allow access to very large portions of data within the single parallel program), and slow data transfer rates (example 6 GB/sec) between a host processor memory (e.g., external central processing unit (CPU) memory) and a GPU device (e.g., on-board GPU memory).

One embodiment of a graphics processing system comprises a realistic image synthesis of a geometric scene with textures wherein textures represent spatially varying properties of geometric objects, wherein a processing system requires performing an access (read/write) to the textures applied to scene objects wherein an access request may point to random locations. In some embodiments the requirement of performing random access is dictated by Monte Carlo numerical processing methods comprising ray tracing and stochastic sampling used in lighting simulation during image synthesis of a scene. It is not known in advance which textures and texels will be accessed during synthesis of one realistic image. The process of generating any pixel of a realistic image may require an access to any random texture and any texel within the texture.

Certain embodiments of graphics processing systems are disclosed that provide one or more high-throughput solutions for requesting access to large amounts of textures needed for processing (e.g., the plurality of textures of the graphics processing system may require tens or hundreds of gigabytes of data of storage capacity not available in one processor memory). Certain embodiments of graphics processing systems use widespread GPUs and CPUs in a single-level or multi-level caching system wherein massive data requesting and processing is performed by a memory limited processor comprising a GPU.

In some embodiments of a graphics processing system, many data processing queries may be assembled into a large group of queries. This group is submitted to the parallel processor GPU and all the queries are processed in parallel. For instance, a query is assigned to the single parallel thread performing various kinds of computations on data, sometimes requesting access to the out-of-core textures, accessing the values and further processing them in the various of tasks comprising generating geometry surface or volume display and computing the interactions with surrounding media. If requested data by a query is in-core (e.g., stored or cached in a processor memory), the data processing is performed. If the data is out-of-core (e.g., stored only in external memory, distinct to a processor and not yet in the processor cache), the processing of this data is postponed for this query and an interrupt is prompted. When the execution for all the parallel threads is complete (each query either completes processing or postpones it), the necessary data is delivered to the GPU memory and the computation resumes for all the parallel threads. Each thread is then either idle or involved in processing of required data, which may be available in GPU memory at this time but was missing on the previous invocation.

Emphasis is placed on the manner of efficient handling by a processor of a virtual page table for very large amount of pages, wherein a large number of small pages is generated for large plurality of all the textures, enabling efficient caching of requested portions of data, wherein it is impossible to store the full page table for all the pages in a given memory capacity of a processor, wherein a processing system may perform efficient high-throughput access to incoherent data locations randomly distributed across the plurality of all the textures, wherein the storage requirements of the plurality of all the textures may exceed the processor memory capacity, wherein a multi-level page structuring within a texture and multi-level caching may be used to maximize the data transfer bandwidth when the data is transferred between external memory and one cache level.

Having summarized certain features of graphics processing systems of the present disclosure, reference is now made in detail to the description of the disclosure as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

There are a few terms used in the disclosure and identified below to assist in providing an understanding of certain embodiments of graphics processing systems. It should be appreciated that these terms are for illustration, and in some embodiments, not intended as limiting.

A texture typically represents an array of data values of the same type. Textures can be one-dimensional (1D) arrays, two-dimensional (2D) arrays, three-dimensional (3D) arrays or even higher dimensional arrays. Each element of such array is called a texel and may store any type of data. Any data array or structure may be considered as a texture with a one-dimensional array of bytes (simplest kind of texel). Hence the example methods presented in the current disclosure are not necessarily limited to the texture terminology but may be applied to any other data processing areas.

An example 2D texture 100 is shown in FIG. 1 comprising a plurality of texels, wherein each texel 101 is of the same data type. The texture 100 has 2D size: w texels in width and h texels in height. The texel coordinates inside the texture 100 are given by a 2D number.

One example application of a 2D texture by a graphics processing system is discrete representation of spatially varying attributes comprising color, reflectance and/or other properties wherein the 2D texture is mapped on the surface of the geometry object, wherein a user-specified utilization of a texture mapped on a surface drives various kinds of surface interaction with physics events and surface display. Texture array elements (texels) usually store discrete values distributed evenly across the texture domain. Intermediate texture values (which are not stored explicitly) may be computed by a processing system using interpolation among neighbor stored texel values.

For 3D textures, three numbers are used for array dimension size, texel coordinates, etc. A 3D texture (or higher dimensional texture) is viewed as an extension of a 2D texture with a new dimension. One example embodiment of a 3D texture is a discrete representation of a volume in a scene as employed by a graphics processing system.

All the methods or drawings presented in the current disclosure may mention a texture or 2D texture examples. However, certain descriptions and methods of the present disclosure also apply to the textures with different dimensionality: 1 D, 3D and higher.

Figure 2:
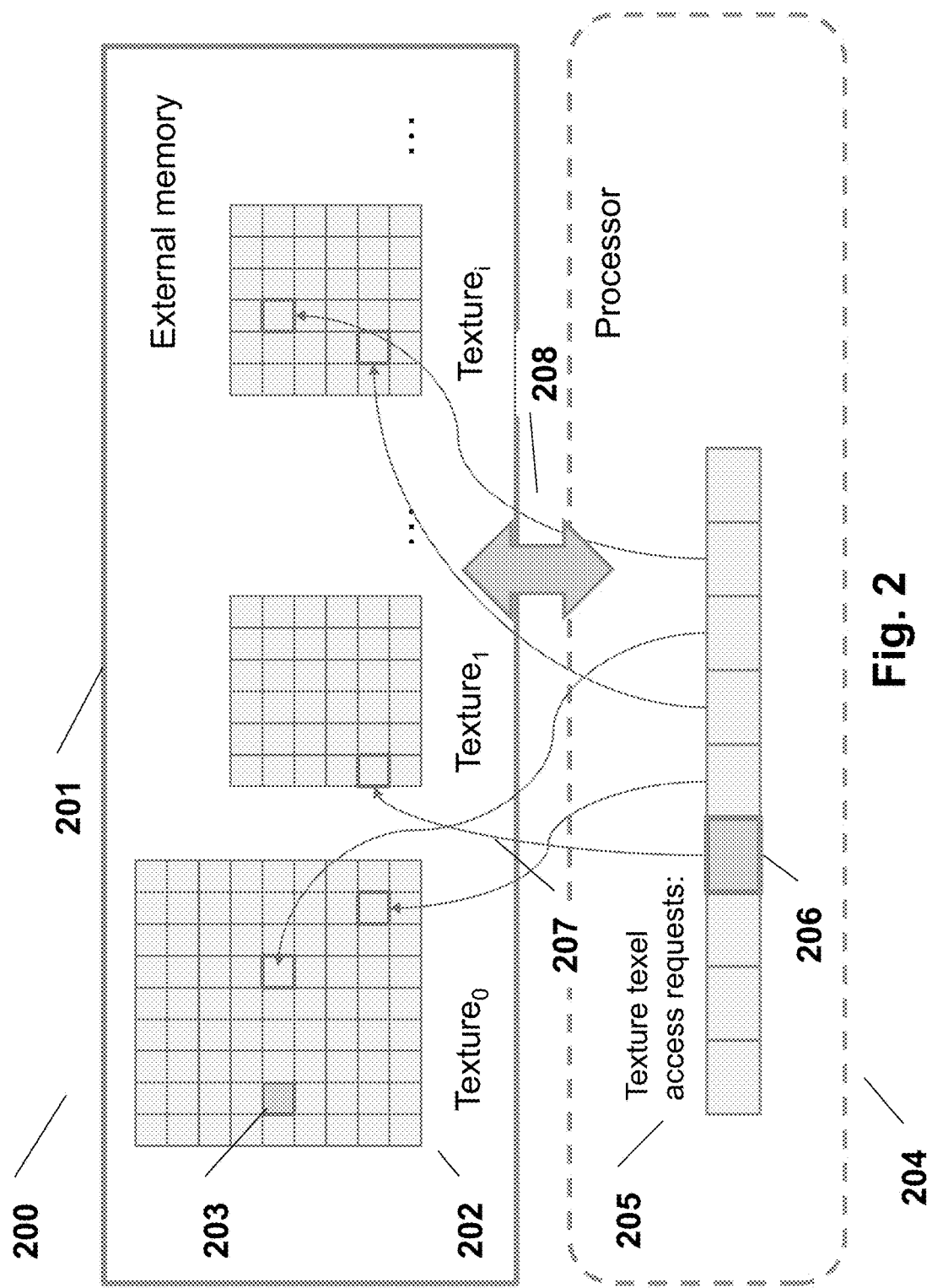
FIG. 2 is a schematic diagram that illustrates an example data processing system wherein a processing system requests textures from a plurality of all the textures.

Attention is now directed to FIG. 2, which provides an illustration of one embodiment of a graphics processing system scheme 200 performing access by a processor 204 to the plurality of all the textures 202 stored in external memory 201, wherein external memory is distinct from processor 204 internal memory. Each texture 202 from a plurality of all the textures comprises a plurality of texels 203 of the same type. Storage representation of the plurality of all the textures may not fit the storage capacity of the processor 204 internal memory. Certain embodiments of the processor 204 comprise a parallel architecture, and a plurality of texture access requests 205 are performed in parallel by the processor 204. Each individual request for texture access 206 comprises a texture identity and texel coordinates within a texture pointed by the texture identity wherein a texture identity points 207 to the texture from a plurality of all the textures 202. The mechanism of data transferring of requested texels by the processor 204 comprises a utilization of a data bus 208.

An example external memory 201 comprises a data storage unit such as central processing unit (CPU) memory (such as double data rate DDR memory), computer readable medium, disc storage or network storage or a plurality of different storage memories.

The example processor 204 comprises a graphics processing unit (GPU) or central processing unit (CPU) or any other processor or a plurality of processors.

In some embodiments, for instance where the processor 204 is embodied as a GPU, one example external memory 201 for the GPU is internal CPU memory, wherein one example data transfer mechanism uses a PCI Express interconnection 208 between the CPU memory and the GPU. Embedded systems, wherein GPU and CPU chips are placed on a single die, replace interconnection 208 with direct communication between processors via the same internal memory for both the GPU and CPU.

Another example of external memory is a computer readable medium, such as disc storage (SSD disc or SATA disc) or network storage, which are both considered external memory for any processor 204 such as a GPU or CPU.

One example complex external memory 201 for the processor 204 embodied as a GPU is the plurality of disc storage devices and CPU memory devices described in more detail hereafter.

Figure 3:
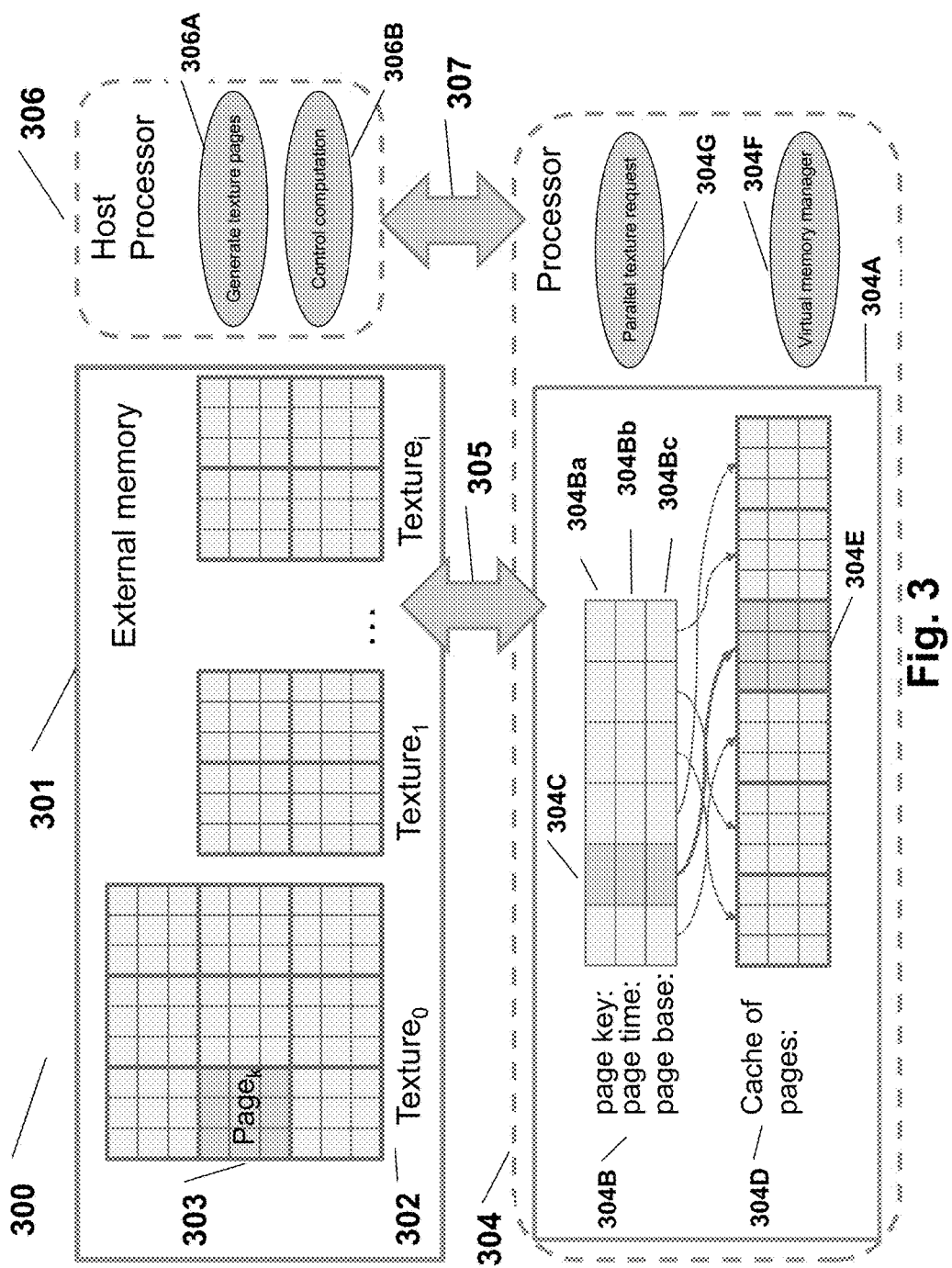
FIG. 3 is a schematic diagram of a method by which an embodiment of a graphics processing system organizes a plurality of textures into a plurality of pages and organizes a texture request access by a processor and organizes page caching inside the processor memory.

Attention is now directed to FIG. 3, which provides an extension to the scheme 200 (FIG. 2), wherein further details of data transfer organization are presented for one embodiment of a texture request and caching system scheme 300 performing random access by a processor 304 to the textures 302 stored in external memory 301, wherein the external memory 301 is distinct from the processor 304 internal memory 304A.

One embodiment of a graphics processing system 300 comprises the processor 304 and external memory 301. If the processor 304 is embodied as a GPU, then the graphics processing system 300 further comprises a host processor (e.g., central processing unit or CPU) 306. In some embodiments, the graphics processing system 300 may comprise plural processors, or in some embodiments, a single processor (e.g., with functionality of the host processor and GPU). In some embodiments the GPU 304 and CPU 306 represent a hierarchy of processors in the graphics processing system 300, where the GPU 304 executes parallel programs (such as performing texture access requests and performing further manipulations on returned data), and the CPU 306 performs supplemental tasks and invokes parallel GPU programs. External memory 301 may coincide fully, partially or not coincide at all with internal memory of the host processor 306.

The embodiments of parallel programs executed by the processor 304 comprise parallel requests for texture access function 304G, and a virtual memory manager 304F. The processor 304 further comprises a processor internal memory 304A, wherein the processor internal memory 304A comprises a cache of pages 304D and a page table 304B.

One embodiment of a texture access function 304G performs multiple texture access requests (corresponding to texture access requests 205 in FIG. 2) and the data is delivered to the requesting function utilizing the processor cache 304D and data transfer channel 305. The processor cache of pages 304D comprises temporal storage of at least a portion of the pages of textures (wherein the plurality of pages 303 represents one storage variant of the plurality of textures 302 wherein pages of textures are further described below) that is transferred to the processor cache 304D on demand. The processor virtual memory manager 304F implements a page replacement policy and a page transfer order that may use the page table 304B.

One embodiment of graphics processing system 300 comprises page generator 306A by the host processor 306 for the plurality of textures 302. One example embodiment of the page generator 306A may utilize computations performed by the processor 304.

One embodiment of page generation methods 306A further comprises dividing the textures from a plurality of textures 302 into plural evenly sized pages 303, wherein each page comprises a subset of the texels that are proximal to each other relative to the other of the texels of a particular texture; and allocating an equal size memory block inside external memory 301 for each respective page for the plural pages, wherein all the plural pages comprise one storage representation of the plurality of textures, wherein each page can contain up to M texels, where M is an integer number, wherein a low value of M implies dividing the textures into high number of pages NP comprising different representation for the same plurality of textures.

In certain embodiments of the page generation 306A, it is efficient to produce a lot of small pages 303 (e.g., comprising a low number M of texels). This preference comes from the possibility of requesting a lot of completely random textures and texel coordinates by the request function 304G (see corresponding array of texture requests 205 FIG. 2). If any texel of a particular page is requested by the request function 304G, then the whole page data (including all the texels of the page) is transferred through the data communication channel 305: higher number of M implies transferring a lot of irrelevant texels through 305, wherein a lot of texture access requests are highly random. A lower number M of texels per page implies generating by page generation 306A the smaller pages and implies transferring less irrelevant data through channel 305 in the case when the texture access requests by the request function 304G are highly random. In practice, a lower number of M increases the cache hit rates of a configured texture page cache system.

However, a lower number of M implies generating by page generator 306A a higher number NP of pages for the same plurality of textures 302, and hence the embodiments of standard methods of building page tables for a plurality of pages may become inefficient demanding large storage capacity which may be not available on a processor memory (e.g. one terabyte of the plurality of textures and page size M corresponding to 1 kilobyte would result in a page table size corresponding to 1 billion page table entries).

In the current disclosure, one embodiment of a graphics processing system comprises a virtual page table that is never stored anywhere, wherein each individual page has a corresponding unique page key identifying this page exactly among the plurality of all pages representing the plurality of all textures. One example embodiment of a graphics processing system comprises computing a unique page key for each page during the process of page generation 306A. Another example embodiment of a graphics processing system comprises considering a Km bit page key, wherein the higher (or lower in some embodiments) Kh bits of a page key represent a texture identity and the lower (or higher n some embodiments) Kl bits represent a local page identity inside a texture computed trivially from texture dimensions and a texel id wherein Km>=Kh+Kl.

One embodiment of a texture page caching method comprises allocating the cache of pages 304D in the processor memory 304A that is capable of storing CachedNP pages, wherein CachedNP depends on the processor memory size and a user setting; and allocating in a processor memory 304A a page table 304B comprising a plurality of CachedNP descriptors 304C corresponding to the pages stored in the cache of pages 304D; wherein each page descriptor comprises a page key 304Ba, page time 304Bb and a base address 304Bc wherein:

a page key is unique key of the page among all the pages of the plurality of textures 302, wherein in some embodiments of graphics processing systems, all the page table descriptors are sorted by a processor with a growing (or lowering in some embodiments) page key order prior to any use of the texture request function 304G, a page time is the time when the page data was recorded to the cache of pages 304D, a base address of the page 304C corresponds to the base address of the page storage 304E in the processor cache of pages 304D.

Figure 3A:
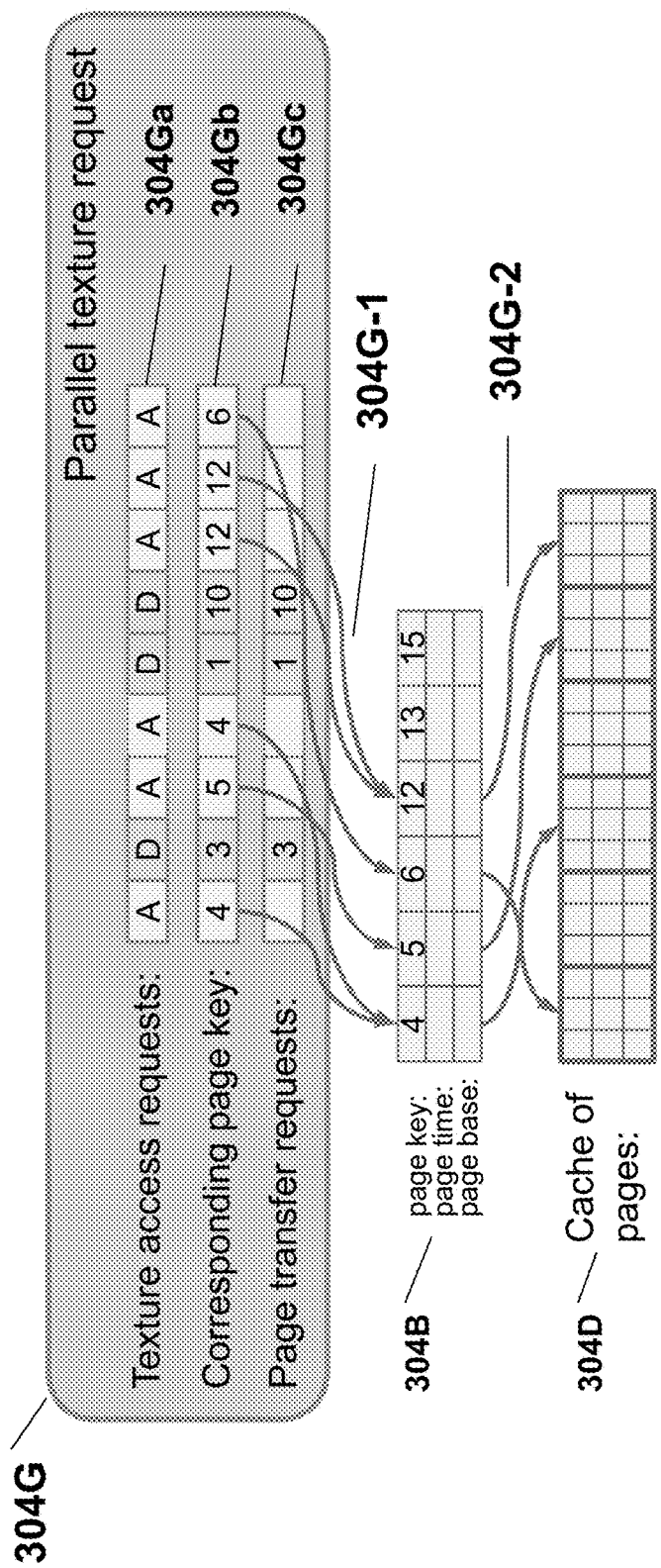
FIG. 3A is a schematic diagram presenting further details of a method by which an embodiment of a graphics processing system retrieves an access to the texels belonging to the pages cached in a processor memory.

Attention is now directed to FIG. 3A, which illustrates further details of the texture request function 304G and is an extension of FIG. 3. In one embodiment, a texture request function further comprises:

1) organizing an access by a processor 304 to the texels from a plurality of requested texels 304Ga wherein each texel request determines texel coordinates within the textures from a plurality of all textures 302 (FIG. 3);

2) and computing a page key 304Gb for a page corresponding to the requested texel, searching by the processor 304 for a page descriptor in a page table 304B using the page key 304Gb as the search key (step 304G-1) and:

2.1) accessing to the requested texel if the page descriptor is found in a page table 304B (corresponding texture access requests are marked with 'A') wherein the page data comprising requested texel is stored in a page cache 304D location pointed by a page base address corresponding to the found page descriptor (step 304G-2);

2.2) (attention is now directed to FIG. 3B, which illustrates further details of the texture request function 304G and memory management function 304F and is an extension of FIG. 3) writing a page key to the supplemental buffer of page transfer requests 304Gc corresponding to the plurality of texture access requests 304Ga by request function 304G in the case of a page key not found in the page table 304B (texture access requests 304Ga with cache miss are marked with 'D').

After the function 304G finishes executing, the control goes to virtual memory management function 304F. If the texture request function 304G returns a non-empty buffer of page transfer requests 304Gc, an embodiment of the memory management function 304F executes the steps comprising:

1) Step 304F-1 (see FIG. 3B): sorting by a processor the page table 304B by the order of the page time field.

2) Step 304F-2: transferring by a processor (or a host processor) the data of the pages 303 corresponding to the distinct requested page keys 304Gc from external memory 301 to the cache of pages 304D to the locations pointed by the page base of the page descriptors with the least page time, wherein the page key field of affected page table descriptors is updated with the page keys of incoming pages, wherein the page time field of affected page table descriptors is updated with the current time. The number of page transfers is not exceeding the number of allocated page table 304B and page cache 304D entries, preventing overflow.

3) Step 304F-3: sorting by a processor the page table 304B by the order of the page key field.

Figure 3B:
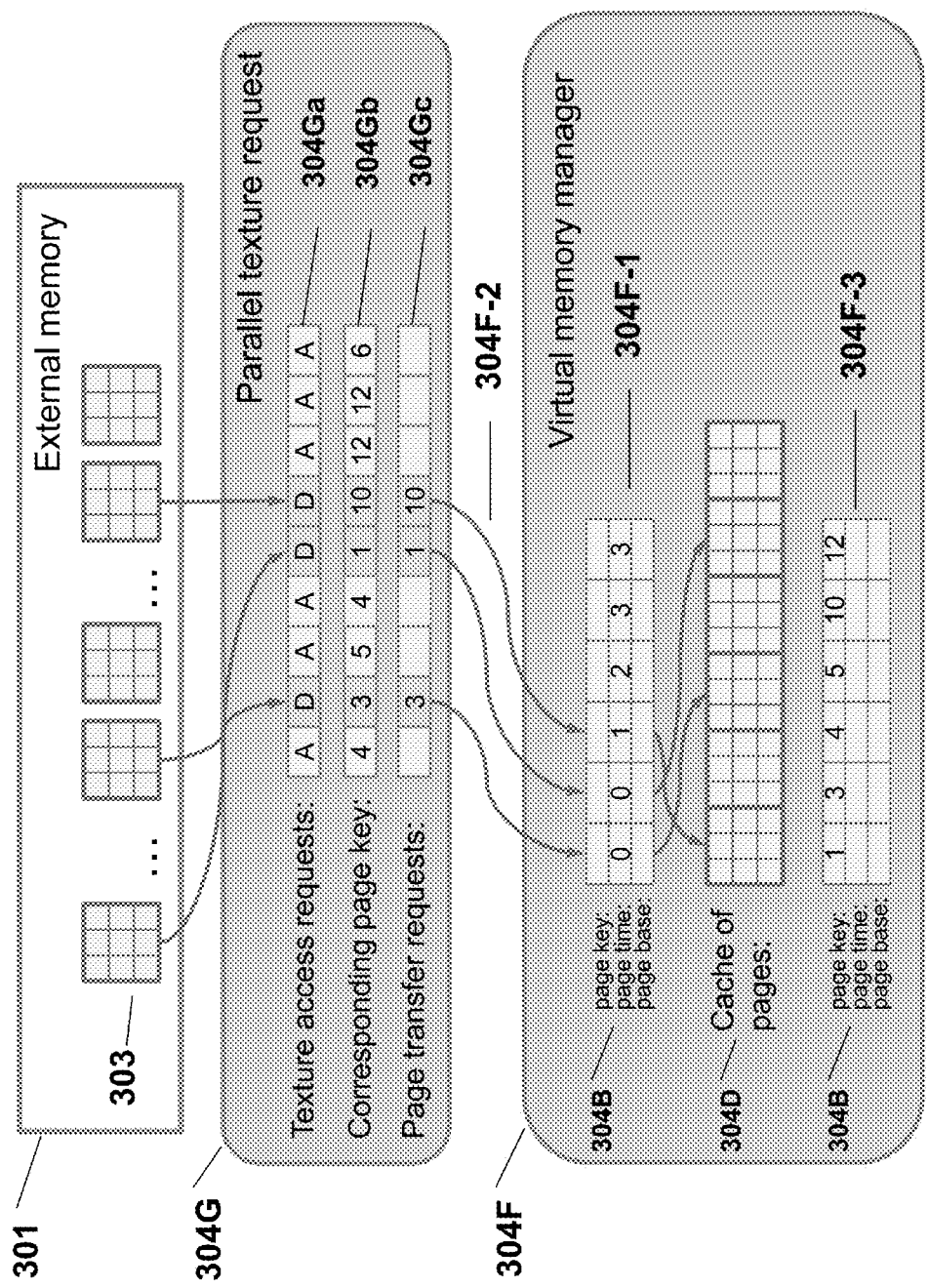
FIG. 3B is a schematic diagram presenting further details of a method by which an embodiment of a graphics processing system requests the pages from external memory and updates the cache system in the case of requesting the texels belonging to the pages not presented in a cache of a processor memory.

After the function 304F finishes executing, the control goes to the texture access request function 304G wherein the texture access is requested again for all the texel coordinates with denied access 304Ga in the previous time (304Ga, see FIG. 3B: marked with 'D').

One having ordinary skill in the art should appreciate in the context of the present disclosure that the architecture 300 shown with various details in FIG. 3, 3A, 3B is for general, illustrative purposes, with other variations contemplated to be within the scope of the disclosure. In other words, it should be appreciated by those having ordinary skill in the art that a graphics processing system may have additional and/or different components, array sorting orders, search algorithms and page replacement policies than those illustrated by the graphics processing system 300.

One example method embodiment, embodied in pseudo-code (referred to herein as pseudocode1), provides a main-loop of one embodiment representing a system of data requesting, caching and processing utilizing one of the possible among others page replacement policies, wherein sort-functions may run by parallel processors comprising GPUs and the bodies of "for" loops may represent the threads of parallel programs running on a parallel processors comprising GPUs:

```
// virtual memory manager, function 304F (FIG. 3B)
bool transfer_to_cache(TABLE page_table,
        void * page_cache,
        int64 * transfer_requests,
        PAGE * external_pages)
{
    // returns now if nothing requested
    if(empty(transfer_requests)) return false;
```

```
     // sorts a page table by a page time field
     // sort is parallel if executed by a parallel processor
     sort(page_table, page_table.page_time);
     // get only distinct keys
     int64 * distinct_keys = get_distinct_keys(transfer_requests);
     // check all distinct keys
     // parallel "for" if executed by a parallel processor
     for(each p = [0..sizeof(distinct_keys)) )
     {
        // read page from external memory
        PAGE incoming_page = read_page(external_pages,
distinct_keys[p]);
        // address of evicted page
        void * addr_evict = page_table[p].page_base;
        // save incoming page data in place of evicted page data
        copy_to_cache(page_cache + addr_evict, incoming_page,
sizeof(PAGE));
        // used for cache lookups
        page_table[p].page_key = distinct_keys[p];
        // used for least recently used replacement policy
        page_table[p].page_time = current_time( );
     }
     // sorts a page table by a page key field
     // in one embodiment, sorting makes page table lookups very
fast using binary search
     // sort is parallel if executed by a parallel processor
     sort(page_table, page_table.page_key);
     return 1; // something transferred
}
// organising data access request, function 304G (FIG. 3A)
void request_data_access(TABLE page_table,
               void * page_cache,
               TEXEL_COORDS * requests,
               int64 * transfer_requests,
               TEXEL * retrieved_data)
{
   // parallel "for" loop if executed by a parallel processor
   for(each r = [0..sizeof(requests))
   {
     // avoids accessing to completed requests again
     if(null_request(request[r])) continue;
     // computes a page key for given texel coordinates
     int64 page_key = compute_page_key(requests[r]);
     // in one embodiment "search by key" uses binary search if
page table is sorted
     int entry_id = search_by_key(page_table, page_key);
     // if there is a page descriptor with page key found in a
page table
     if(entry >= 0) {
     {
        void * page_base = page_table.page_base[entry];
        // computes local coords of texel inside a page and reads
a value
        retrieved_data[r] = get_texel_from_cache(page_cache +
page_base, requests[r]);
        // excludes request from further processing, it is
"completed"
        requests[r] = null_request( );
     }
     else transfer_requests[r] = page_key;
   }
}
// data processing system taking request coordinates at input
// to requred data from plurality of all the textures
// requests may point to random locations
void data_processing_system(TEXEL_COORDS * requests) {
   // allocated page table and page cache in a processor memory
   TABLE page_table;
   void * page_cache;
   // pages allocated in external memory
   PAGE * external_pages;
   // supplemental buffer for requesting more pages to a page
cache
   int64 * transfer_requests;
   // data values accessed by request coordinates
   TEXEL * retrieved_data;
   bool perform = true;
   while(perform) {
     set_zero(transfer_requests); // sets all elements to zero
     request_data(page_table, page_cache, requests,
transfer_requests, retrieved_data);
     // Bring missing data to cache
     perform = transfer_to_cache(page_table, page_cache,
transfer_requests, external_pages);
   }
   // any user specified data processing on retrieved data
   process_data(retrieved_data);
}
```

Figure 4:
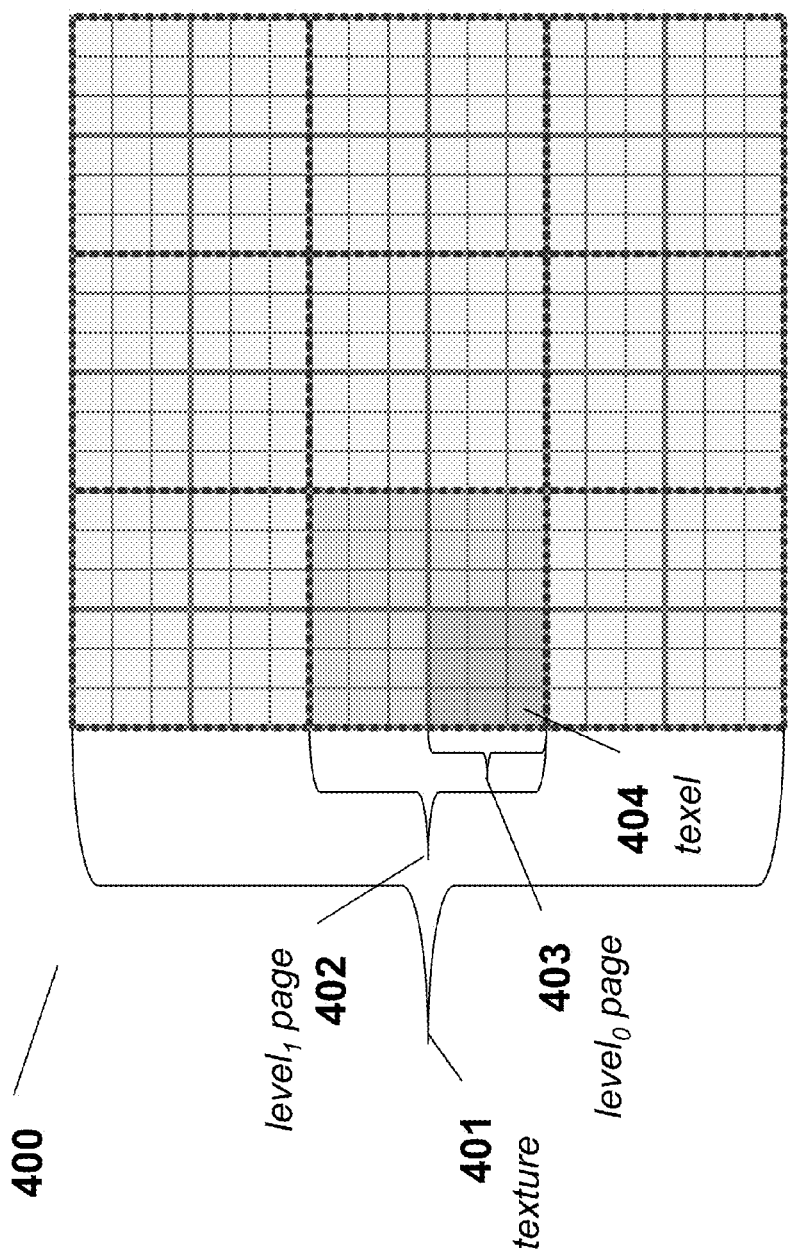
FIG. 4 is a schematic diagram of multi-level page structuring of texture.

Attention is now directed to FIG. 4, which illustrates a scheme of multi-level page structure 400 for a given texture 401. First, a texture is divided by a processor (or host processor) into a plurality of evenly sized pages 403 as described above, wherein each page comprises a subset of the texels 404 that are proximal to each other relative to the other of the texels of a particular texture 401, wherein all the plural pages comprise one storage representation of the texture, wherein each page can contain up to M texels, where M is an integer number, wherein a plurality of resulting pages is named as level0-pages 403 in the current disclosure.

If the level0-pages 403 comprising a texture are considered as texels (big texels having underlying page structure in this case), then it is possible to further subdivide a texture using the just-described procedure into a plurality of evenly sized pages 402 of level1, wherein all the plural pages of level1 comprise another storage representation of the texture, wherein each level1-page can contain up to N level0-pages wherein a plurality of resulting pages is named as level1-pages 402 in the current disclosure.

In certain embodiments the number of page levels may be further refined repeating the procedure described above.

Figure 5:
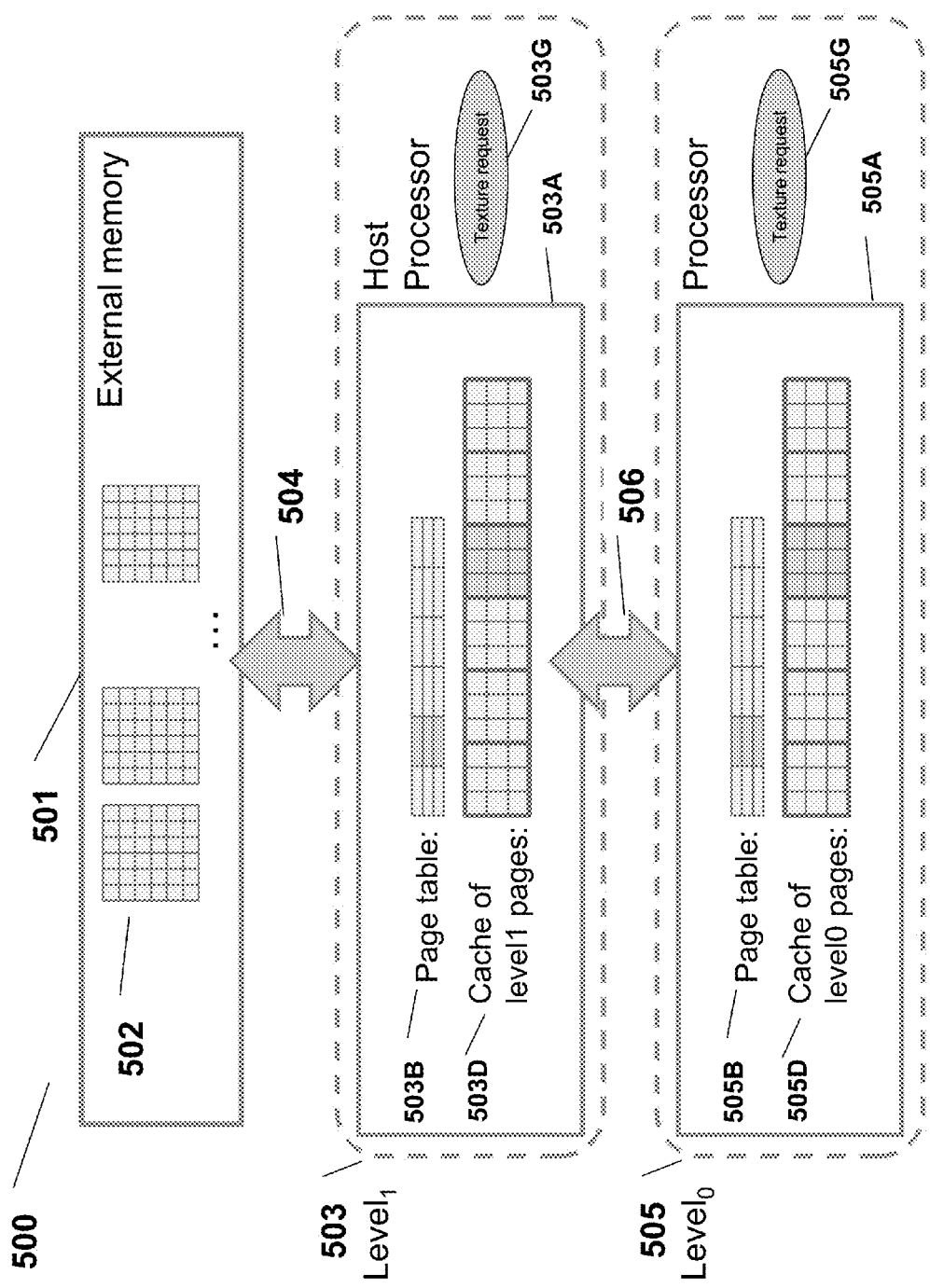
FIG. 5 is a schematic diagram of a method by which an embodiment of a graphics processing system organizes a texture request access and page caching using a multi-level processor and caching hierarchy.

Attention is now directed to FIG. 5, which illustrates a scheme of a multi-level caching structure in the presence of a multi-level processor hierarchy 500 that extends the data processing and caching system 300 (see FIG. 3) with one or few transitional caching levels, wherein multi-level page structuring 400 is used.

One embodiment of multi-level processor hierarchy comprises a processor (Level0 505) and a host processor (Level1 503), wherein both processors have internal memories 505A for Level0 and 503A for Level1.

In one embodiment, each texture from a plurality of textures 502 is subdivided using multi-level page structuring 400 and stored in external memory 501 as one storage representation of the plurality of textures.

In one embodiment, each level processor (processor for Level0 505 and host processor for Level1 503) has the same algorithm of data requesting and caching as a processor 304 (see FIG. 3) comprising the utilization of a page table, a page cache and a texture request access function.

The difference between data processing at different levels is that:

1) a texture request function 503G of Level1 requests level1-pages by a host processor 503 from external memory 501 and stores them in the cache 503D allocated for the data of a level1-page size. A level1-page comprises a number N of level0-pages, which are considered as big texels in the context of texture access request 503G inside level1.

2) a texture request function 505G of Level0 requests level0-pages by a processor 505 from the Level1 (instead of requesting from external memory 501) and stores them in the cache 505D allocated for the data of level0-page size. A level0-page comprises a number M of texels in the context of texture access request 505G inside level0.

In one embodiment, the algorithm of Level0 processing by 505 is similar to the algorithm of processing by 304 in a single-level processing hierarchy 300 (FIG. 3), with a difference that Level0 505 requests pages from Level1 (rather than from external memory 501), wherein texture request access function 503G of Level1 is executed when the level0-pages are requested to be transferred between Level0 and level1.

Figure 5A:
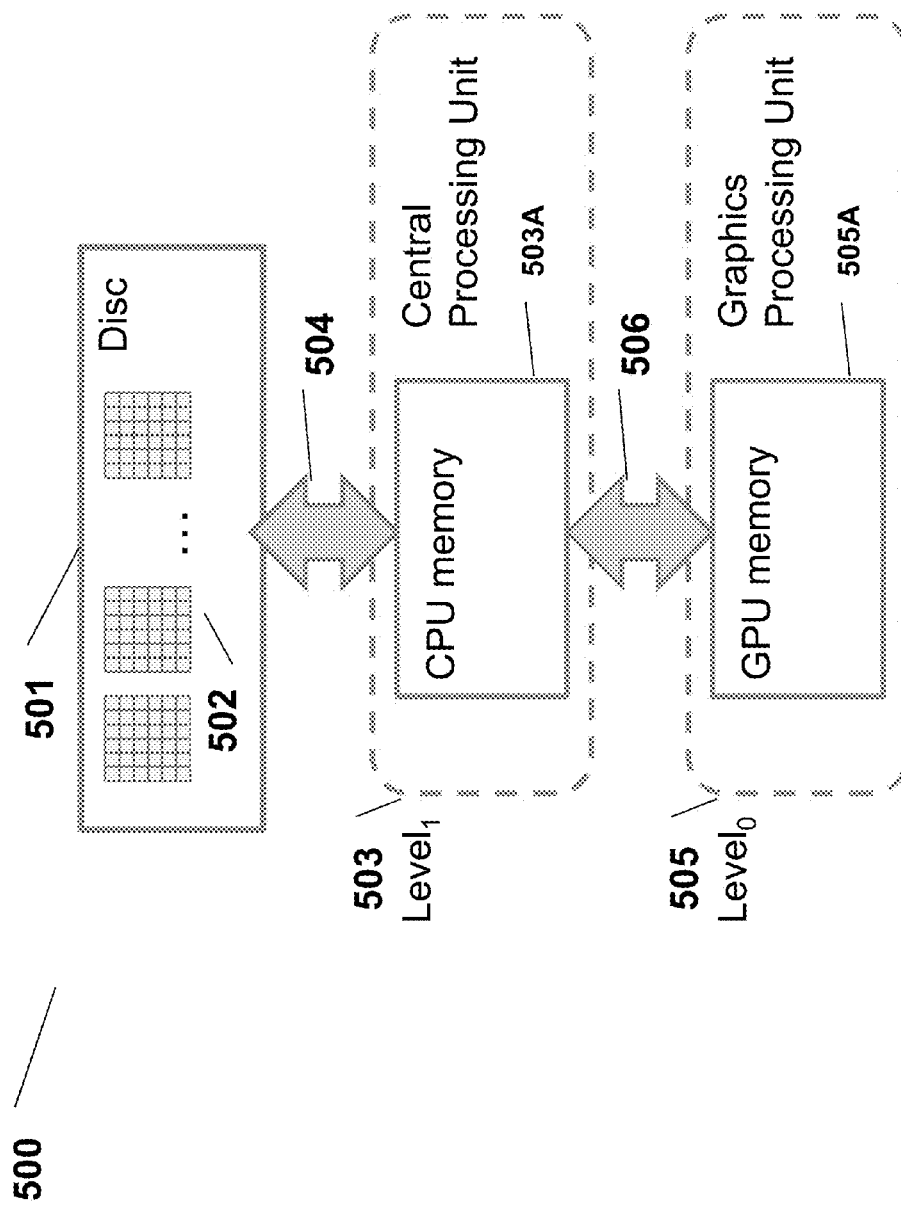
FIG. 5A is a schematic diagram of a method by which an embodiment of a graphics processing system organizes a texture request access and page caching using a 2-level processor and caching hierarchy with a graphics processing unit and a central processing unit.
Figure 6:
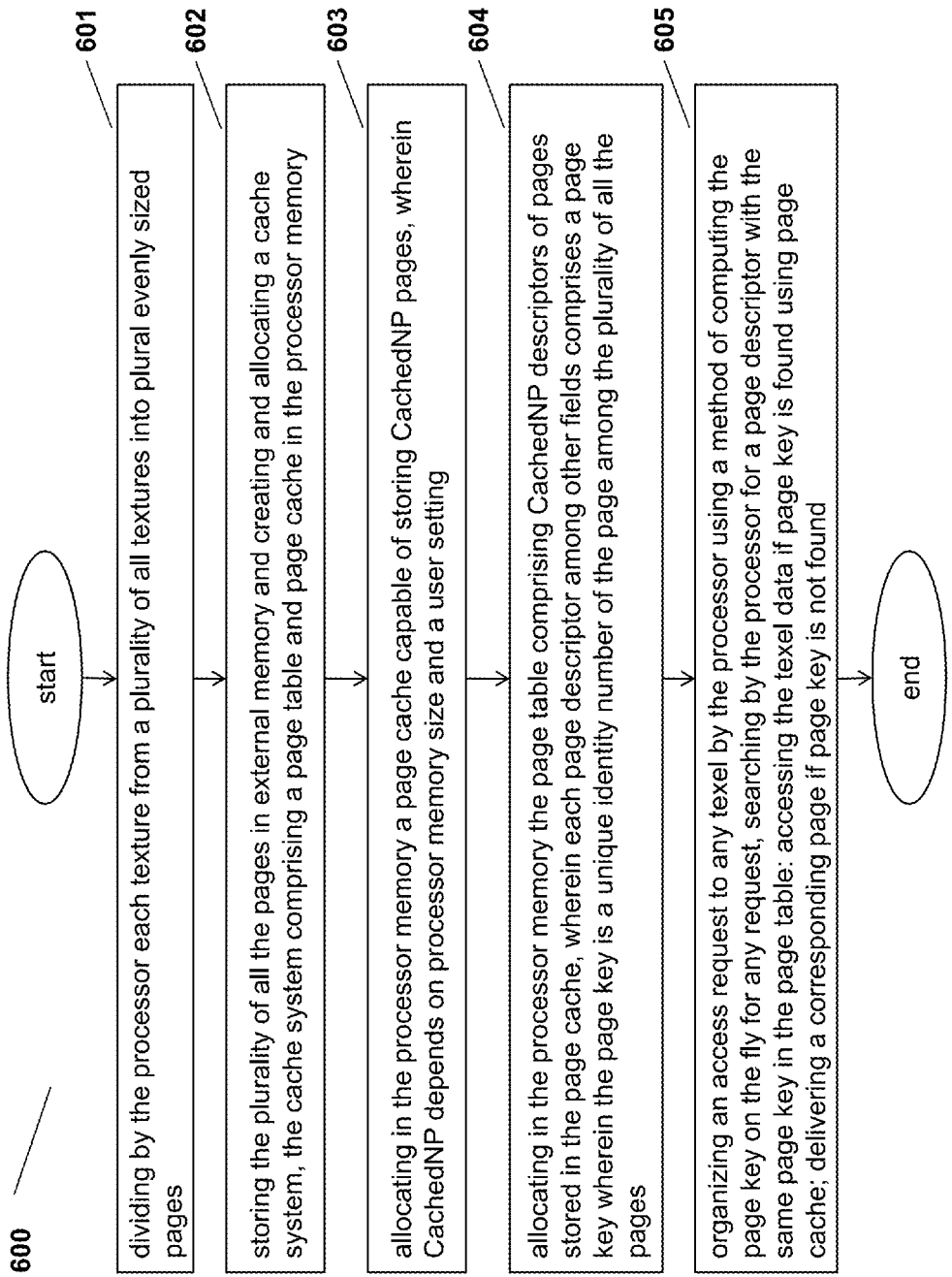
FIG. 6 is a flow diagram that illustrates one embodiment of a graphics processing method.
Figure 7:
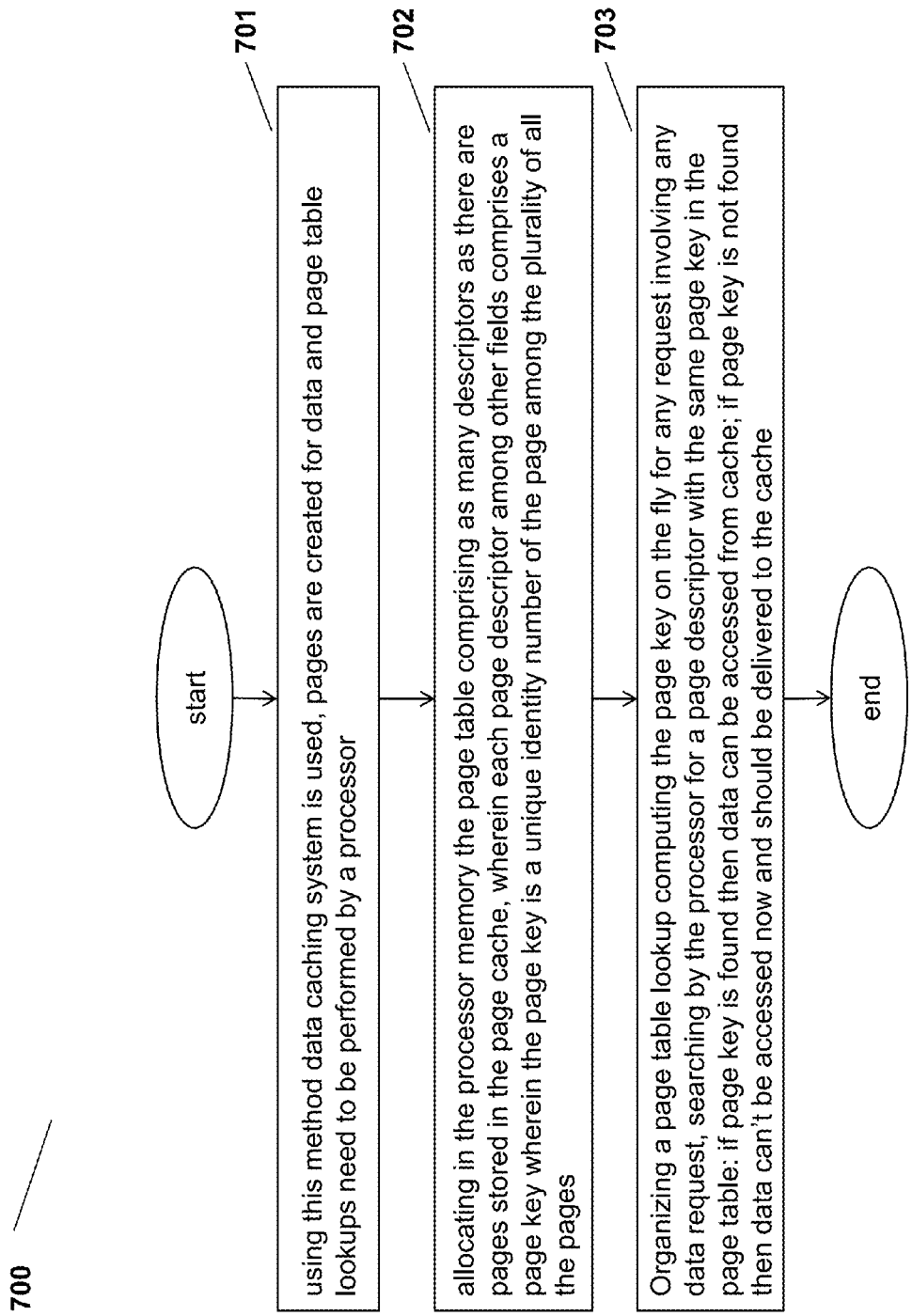
FIG. 7 is a flow diagram that illustrates one embodiment of a graphics processing method.

Reference is now made to FIG. 5A illustrating a practically valuable embodiment of multi-level processor hierarchy 500.

In one embodiment, Level0 processor 505 comprises a graphics processing unit GPU (or a plurality of GPUs) comprising a limited internal memory 505A, fast processing and requesting and processing for texels from the plurality of textures and calling for level0-page delivery from Level1 503 in the case of cache misses inside level0.

In one embodiment, Level1 a host processor 503 comprises a central processing unit CPU (or a plurality of CPUs) comprising internal memory 503A and requesting for level1-pages if the level0-pages are requested by a GPU and organizing level1-page delivery from external memory 501 in the case of cache misses inside level1.

In one embodiment, external memory 501 comprises a computer readable medium such as a disc or a distributed network storage.

Typically the CPU memory is extendable and can be of much larger capacity than the GPU memory. Hence it is possible to allocate a much larger transitional page cache inside CPU memory in order to keep data there for a longer time than it could be kept by a smaller GPU cache (because of the smaller GPU memory).

When the GPU performs lots of random texture access requests the portion of the plurality of the textures represented as the level0-pages which are temporarily stored in GPU cache can be swapped out from GPU cache shortly by newly incoming level0-pages. However, if the transitional CPU page cache is bigger than the GPU page cache, the portion of pages representing the plurality of textures is stored for a much longer time in CPU cache than in GPU cache and can be delivered again to the GPU cache once requested again in a much faster way through GPU-CPU communication rather than through a long latency communication GPU-CPU-External Memory.

The multi-level (actually 2-level in the current embodiment) page structuring of a texture is also efficient as soon as the GPU performs many random texture access requests and hence transferring between CPU and GPU a smaller level0-page for each texture request is efficient as soon as a less amount of irrelevant data per each random request may be transferred and the same GPU cache space may be utilized more efficiently.

Wherein the texture storage representation is very huge, and level0-pages are very small and hence there are lots of level0-pages for the same plurality of textures the virtual page table may be very huge and not fit in GPU memory using standard methods. However, handling a very big virtual page table without storing it and storing only the page table entries that are actually cached inside GPU memory and using a search by a unique page key is efficient for massively parallel architectures such as GPUs, wherein computations are performed very quickly (such as additional search by a key in a page table, potentially with a binary search, compared to a standard page table lookup), and wherein memory limitations are very narrow.

Gathering the page data for a plurality of randomly requested pages from external memory 501 by the CPU 503 using the size of level1-page (big size) for each individual page data transferring transaction may result in an overall higher data transfer bandwidth compared to transferring small level0-pages. This insight comes from example programming experimentations involving reading/writing data from/to a disc (or a network):

1) performing by a CPU read transactions for 1024 data blocks, each of 1024 bytes (1 megabyte overall), wherein each block is randomly placed on a disc, is much slower than:

2) performing by a CPU read transactions for 16 data blocks, each of 64 kilobytes (1 megabyte overall), wherein each block is randomly placed on a disc.

That's why one or more embodiments of a data processing system use multi-level page structuring for a plurality of textures.

Consider one practical example situation wherein there are:

(1) From a few hundred gigabytes to a few terabytes of texture data stored on one or few computer discs;

(2) Typical CPU memory size from 8 to 64 gigabytes, comprising a CPU cache size specified by a user, e.g. 1-20 gigabytes;

(3) Typical GPU memory size from 1 to 6 gigabytes, comprising a GPU cache size specified by a user, e.g. 200 megabytes-2 gigabytes;

(4) Random texture access requests by a GPU.

Then an efficient level0-page size may range from 1024 bytes to 4096 bytes and efficient level1-page size may range from 16 kilobytes to 256 kilobytes.

One or more embodiments of graphics processing system may comprise the application of standard methods of level of details for textures. The hierarchy of level of details is produced for an original texture using a method of information (detail) reduction and pre-filtering performed for a new (coarse) level of detail based on already available (fine) level of detail.

In one or more embodiments of data processing systems, the application of the functionality of levels of details for textures is possible. For this purpose, the necessary levels of details are generated for each texture from a plurality of textures, the same page caches are used for any texture level of detail, and each texture access request comprises an additional parameter identifying a necessary texture level of detail.

One or more embodiments of the graphics processing systems and methods described herein may be implemented in hardware, software, firmware, or a combination thereof. When implemented at least in part in software or firmware, one or more embodiments of graphics processing systems may be implemented in software or firmware that is stored in a memory and that is executed by a suitable instruction execution system. When implemented at least in part in hardware, one or more embodiments of graphics processing systems may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software functionality of certain embodiments of graphics processing systems may comprise an ordered listing of executable instructions for implementing logical functions, and may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

Any process descriptions or blocks in flow diagrams should be understood as representing modules, segments, or portions of code which include one or more executable instructions for implementing specific logical functions or steps in the process, and alternate implementations are included within the scope of the certain embodiments of the present disclosure in which functions may be executed out of order from that shown or discussed, including substantially concurrently or in reverse order, depending on the functionality involved, as would be understood by those reasonably skilled in the art.

These embodiments, and their relative dependency, are at least partially represented by the accompanying claims. It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method, comprising:
   organizing access request by one or more processors to the elements of textures, wherein a storage representation of the plurality of all the textures comprises a larger size than a capacity of processor memory, wherein the plurality of all the textures are stored only out-of-core, wherein an access is requested to incoherent data locations randomly distributed across the plurality of all the textures;
   dividing by the one or more processors each texture from a plurality of all textures into plural evenly sized pages, each page comprising a subset of texels that are proximal to each other relative to the other of the texels of a particular texture, wherein all the plural pages comprises a representation of the plurality of textures, wherein each page contains up to M texels, where M is an integer number;
   storing the plurality of all the pages in external memory and creating and allocating a cache system, the cache system comprising a page table and page cache in the processor memory;
   allocating in the processor memory a page cache in a form of index structure capable of storing a subset of descriptors of the plurality of all pages wherein a page cache size depends on several limitations comprising the number of plural textures and the texture's size, the size of page in texels, the processor memory size or user setting;
   allocating in the processor memory the page cache capable of storing CachedNP pages, wherein CachedNP depends on processor memory size and a user setting; and
   allocating in the processor memory the page table comprising CachedNP descriptors of pages stored in the page cache, wherein each page descriptor comprises a page key, page time and a base address of the page data in the page cache, wherein the page key is a unique identity number of the page among the plurality of all the pages.

2. The method of claim 1, further comprising:
   organizing an access request to any texel by the one or more processors computing the page key, searching by the one or more processors for a page descriptor with the same page key in the page table;
   accessing to a requested texel if the page descriptor is found in the page table, wherein requested texel data is stored in one of the pages of the page cache pointed by a page base address corresponding to the found page descriptor;
   writing the page key to a buffer of transfer requests corresponding to the texel request and postponing the access request to the texel in case the page key is not found in the page table.

3. The method of claim 2, further comprising:
   performing by the one or more processors the transfer of the pages corresponding to the distinct page keys recorded to the buffer of transfer requests from external memory to the page cache instead of evicted pages from the page cache, wherein evicted pages are determined by a page replacement policy;
   organizing by the one or more processors an access request for all the postponed texel access requests.

4. The method of claim 3, further comprising creating a multi-level data processing and caching system comprising a processor inside level0, a secondary (host) processor inside level1 and optionally a plurality of more processors,
   wherein the plurality of all of the textures is represented using multi-level page structuring, wherein the plurality of all of the textures is divided by the one or more processors into the plurality of pages of level0 size, wherein the plurality of all of the textures is divided by the one or more processors into the plurality of pages of level1 size, wherein a page of level1 comprises several pages of level0 repeating for more levels; wherein level0 cache system is configured for pages of level(0 and the pages of level0 size are transferred by the one or more processors from a cache system of level1 to the cache system of level0; wherein level1 cache system is configured for pages of level1 and the pages of level1 size are transferred by the one or more processors from a cache system of higher level to the cache system of level1; wherein the pages of the last level are transferred from external memory to the cache system of the last level.

5. The method of claim 4, further comprising sorting by the processor the page table with a growing or lowering page key order prior to performing the texture access request by the processor and using a binary search as the search method of the page key in the page table during performing the texture access request by the processor.

6. The method of claim 5, further comprising computing on the fly by the processor a page key for any texel reference or page reference on demand, wherein the page key representation comprises Km bits total, wherein the higher (lower) Kh bits of the page key represents a texture identity and lower (higher) Kl bits represent a local page identity inside a texture, wherein $Km \geq Kh+Kl$, wherein the local page identity is computed from the texel coordinates inside a texture according to the same rules determining the subset of texels belonging to a page within a particular texture.

7. A method, comprising:
   selecting a processor, wherein a processor comprises a host processor or a graphics processing unit (GPU);
   dividing by the processor each texture from a plurality of all textures into plural evenly sized pages, each page comprising a subset of texels that are proximal to each other relative to the other of the texels of a particular texture, wherein all the plural pages comprise a representation of the plurality of textures, wherein each page can contain up to M texels, where M is an integer number;

storing the plurality of all the pages in external memory and creating and allocating a cache system, the cache system comprising a page table and page cache in a processor memory and also in a host processor memory;

allocating in the processor memory a page cache capable of storing CachedNP pages, wherein CachedNP depends on processor memory size and a user setting;

allocating in the processor memory the page table comprising CachedNP descriptors of pages stored in the page cache, wherein the value of CachedNP may be much smaller than the total number of all the pages, wherein each page descriptor comprises at least a page key and a base address of the page data actually stored in the page cache, wherein the page key is a unique identity number of the page among the plurality of all the pages;

organizing an access request to any texel by the processor using a method of computing the page key, searching by the processor for a page descriptor with the same page key in the page table; and performing an access to a texel if a proper page is found in the page cache and transferring a page data from external memory if the page is not in the page cache.

8. The method of claim 7, further comprising using a host processor or other processor as an additional caching and processing level wherein, the processor from claim 7 is named as primary processor and the host or the other processor is named as a secondary processor;

wherein another set of larger pages is generated by one or more processors for a plurality of textures, wherein each larger page contains several pages created by the method of claim 7, wherein a plurality of larger pages is stored in external memory;

wherein the primary processor performs texture access requests and transfers the pages upon cache misses from the secondary processor instead of external memory;

wherein the secondary processor performs data processing and caching using the same algorithm as the primary processing and caching system;

wherein the secondary processor comprises a larger page cache capacity than the primary processor and temporarily stores the larger pages;

wherein the secondary processor organizes data access requests taking the source from primary processor page transfer requests upon cache misses on the primary processor;

wherein the secondary processor transfers the larger pages upon cache misses from external memory.

9. The method of claim 8, wherein many additional processing and caching levels may be added to the graphics processing system as soon as the new levels have their processors and memory capacities enough for storing a cache of pages of various size wherein additional processors comprising additional cache levels may be interconnected for data exchange.

10. A system, comprising a data processing system, the data processing system configured to:

handle, by a processor, a virtual page table for large amounts of pages of a data array;

select a page size for the data array, wherein selecting the smaller page size implies a larger number of evenly sized pages being generated as one storage representation of the same data array, wherein the data processing system performs access to incoherent data locations randomly distributed across the whole data array, wherein the storage requirements of data array are capable of exceeding the processor memory capacity;

allocate in the processor memory a page cache capable of storing CachedNP pages, wherein CachedNP depends on processor memory size and a user setting;

allocate in the processor memory a page table comprising CachedNP descriptors of pages stored in the page cache, wherein the value of CachedNP may be much smaller than the total number of all the pages, wherein each page descriptor comprises at least a page key, and a base address of the page data actually stored in the page cache, wherein the page key is a unique identity number of the page among the plurality of all the pages;

organize a read/write out-of-core access request by the processor to any data location computing the page key, searching by the processor for the page descriptor with the same page key in the page table:

access the requested data location if the page descriptor is found in the page table, wherein a requested data element is stored in one of the pages of the page cache pointed by a page base address corresponding to the found page descriptor;

organize an on demand transfer of one or more missing pages to the processor cache if the page key is not found in the page table.

11. The system of claim 10, wherein the processor comprises a graphics processing unit (GPU) or a plurality of GPUs.

12. The system of claim 11, wherein a data array comprises a plurality of textures comprising 2D textures mapped to a geometric surface of a graphics processing system performing realistic image synthesis wherein the textures represent spatially varying properties of the surface.

* * * * *